(12) United States Patent
DeWaard (10) Patent No.: US 11,490,587 B2
(45) Date of Patent: Nov. 8, 2022

(54) TWO-TANK WEIRED RESERVOIR AND METHOD OF USE

(71) Applicant: Dari-Tech, Inc., Lynden, WA (US)

(72) Inventor: David DeWaard, Lynden, WA (US)

(*) Notice: Subject to any disclaimer, the term of this patent is extended or adjusted under 35 U.S.C. 154(b) by 0 days.

(21) Appl. No.: 16/673,600

(22) Filed: Nov. 4, 2019

(65) Prior Publication Data

US 2020/0060220 A1 Feb. 27, 2020

Related U.S. Application Data (63) Continuation of application No. 15/596,704, filed on May 16, 2017, now Pat. No. 10,568,298, which is a continuation of application No. 14/703,585, filed on May 4, 2015, now abandoned.

(60) Provisional application No. 61/987,854, filed on May 2, 2014.

(51) Int. Cl.
| | | |
|---|---|---|
| A01K 1/01 | (2006.01) | |
| B01D 21/34 | (2006.01) | |
| B01D 21/01 | (2006.01) | |
| B01D 36/04 | (2006.01) | |
| B65D 88/54 | (2006.01) | |
| A01C 3/02 | (2006.01) | |

(52) U.S. Cl.
CPC .............. *A01K 1/01* (2013.01); *B01D 21/01* (2013.01); *B01D 21/34* (2013.01); *B01D 36/04* (2013.01); *B65D 88/54* (2013.01); *A01C 3/02* (2013.01); *Y02A 40/28* (2018.01)

(58) Field of Classification Search
CPC .................................................. B01D 21/0018
See application file for complete search history.

(56) References Cited

U.S. PATENT DOCUMENTS

| | | | | |
|---|---|---|---|---|
| 5,840,195 A | * | 11/1998 | Delsalle | B01D 21/0018 |
| | | | | 210/713 |
| 6,531,057 B1 | * | 3/2003 | Houle | B01D 21/2455 |
| | | | | 210/104 |
| 6,860,997 B1 | * | 3/2005 | Frederick | C02F 3/286 |
| | | | | 210/259 |

* cited by examiner

*Primary Examiner* — Peter Keyworth (57) ABSTRACT

A method and apparatus for collecting agricultural manure in a confined animal feeding operation includes a separator which receives heavy manure removing particulate from suspension to produce light manure. Heavy manure is collected to a volume of heavy manure sufficient to substantially fill the first tank. Within the first tank, particulate migrates, due to the influence of gravity to form a layer containing manure comprising a lesser density of particulate than is present in the volume of heavy manure. Additional heavy manure buoys the layer such that the upper surface exceeds a height of a weir. The weir is situated in a channel communicating between the first tank and a second tank configured to receive light manure from the separator.

17 Claims, 9 Drawing Sheets

TWO-TANK WEIRED RESERVOIR AND METHOD OF USE

PRIORITY CLAIM

This application is a continuing application and claims its priority from the Utility application Ser. No. 15/596,704 dated 16 May 2017, which, in turn is a Continuing Application of and claims priority to Utility patent application Ser. No. 14/703,585 dated 4 May 2015 and is entitled, "TWO-TANK WIERED RESERVOIR AND METHOD OF USE", which, in turn claims priority from and entirely incorporates the Provisional Application filed as Ser. No. 61/987,854 on May 2, 2014, entitled "Manure Management Using Centrifuge" by David DeWaard.

FIELD OF THE INVENTION

The present description sets forth a manure and water management system for livestock, specifically for managing distinct qualities of liquid manure.

BACKGROUND OF THE INVENTION

Water use is essential in all dairies. Drinking water is indispensable to sustain life of cattle; some additional water is necessary for cleaning and sanitation procedures; moderate further amounts are important in periods of heat stress for evaporative cooling of cows to improve animal production and health; and additional amounts can be used in labor-saving methods to move manure and clean barns by flushing in properly designed facilities. The more water a farm uses, however, the greater the potential for surface runoff and penetration to the ground water, with possible environmental impacts offsite. Heightened environmental concerns and the need for resource conservation have resulted in the implementation of water use permits and other possible regulatory actions. Thus, it is important to ascertain how much water is necessary for all the various procedures to operate a dairy and to look for ways to reuse some water when to do so is feasible.

To give a very rough scale of manure production, typical dairy animals produce about 1.61 ft$^3$ (12.0 gallons) of fresh manure (feces and urine) per 1,000 lb. according to their average live weight per day. Additional solids add to that volume and come from wasted feed, horn, tail, and hoof fragments, free stall bedding, and soil tracked in from outside lots. Additional water is often added to that present in the dairy from water wastage, milking center waste water, water used to clean floors, and "flushing" of alleys. When facilities are designed with concrete floors they are generally engineered with enough of a slope to permit the use of water propelled by gravity to move manure, known as flushing. Flushing is a clean and labor-saving method for moving manure out of the scope of the dairy animal's activities. A flush flume system uses the additional movement of fast flowing water in gutters to transfer manure across the width of a barn or across several barns. A high volume pump creates an adequate flow rate to prevent settling of manure solids and bedding material within the gutters.

The amount of water used for flushing per cow will vary widely, depending on the size and design of facilities and the frequency of flushing, and because of differences in design, the necessary amount of water will need to be individually calculated for each dairy. Generally, usually a "flush" of about 10,000 gallons is needed to clean an alley width of 10 to 16 feet. If four alleys are common for every 400 cows, and the alleys are flushed twice daily, this would be an average use of 200 gal./cow/day. Many dairies use more than two flushings per day. But water is not free, nor is the disposal of waste water. Understanding these volumes, one can readily appreciate the value of any water reclamation, by separating water from the manure it entrains in the gutters, as having a great and positive effect on the economics of a dairy.

Dairy manure is a complex mixture of two vastly different materials—water and undigested feed. Typical material proportions, for instance, are such that in 115 lb. of manure at 15% solid content and a bulk density of 62 lb./ft$^3$ might be mixed with 55 lb. of sand at 95% solid content, and a bulk density of 110 lb./ft$^3$. When added in these proportions, the result is 170 lb. of "heavy" manure at approximately 40% solid content and a bulk density of about 72 lb./ft$^3$. At these proportions, sand held in suspension will not settle out of the manure but can be held largely indefinitely, causing the manure to be highly abrasive when pumped. For that reason, the more dilute the manure, the more suitable for use in the flush or flume dairy.

Gravity enables the first form of reclamation; the managing dairyman simply stores manure-laden water flowing from the gutters in a reception pit (a smaller tank for short-term storage to facilitate separation) or in lagoons (larger ponds that operate identically) and allows, over time, the solids to settle out of the water. Sooner or later, however, reception pits and lagoons become choked with the accumulation of solids. The diversity of waste presents its own problems because the gutters contain not merely manure but other solids such as bedding and other unwanted material draw entrained to the lagoon. Wooden hoof blocks, breeding gloves, plastic pieces, rocks and neck straps will clog pumps and create problems in different points in the system. Yet, because organic waste in the manure had value as fertilizer or as a precursor to fuel, the prudent dairyman would want to recover both of the water and the organic solids separate from inorganic waste. To do so makes pure economic sense.

Generally, the settling rate of particles within manure is affected by the particle's attributes (specifically, the size, shape, and density) relative to the density and viscosity of the liquid being passed through. If a particle is sufficiently large and dense, it will settle out of suspension as a discrete particle, such as a rock drops through a column of water. As a particle settles, it accelerates until the frictional drag on its surface equals the weight of the particle in the suspending fluid. Once friction and gravity are equal, the particle travels downward at a constant velocity, called its terminal velocity.

If there are many particles falling at the same time, the relative velocity between the particle and the fluid passing over it increases, since the space between particles is smaller. If the space is smaller, and the amount of fluid remains the same, the speed at which the fluid flows must increase. The individual particles slow down as the relative velocity of fluid acting against them increases. If the concentration is great enough, the fluid velocity between particles causes the solids to settle as a group with uniform concentration. Settling solids appear as a cloud with a distinct boundary between the top of the cloud and the clear liquid above it. The settling of particles as a cloud is called hindered or zone settling. The speed at which the border between clear liquid and the cloud passes through a column is the settling velocity of the slurry.

Merely separating water from the solids is not adequate; the solids in manure are a nonhomogeneous amalgam which often includes sand as well as an admixture of organic matter and inert solids in diverse sizes. When such solids are suspended in manure, the suspension presents a necessity of sorting the solids in the course of removal. Vegetable matter is compostable, digestible, and flammable. Plastic gloves, metallic debris, and the like, diminish the utility of this vegetable matter. Naturally, it is easiest to remove these items early on and most advantageously, without requiring manual picking from the manure. Because they are so much larger in size than the remaining suspensions within the manure, screens prove advantageous for a first removal mechanism, and are often situated in the gutters themselves or at the gutter outlet to immediately remove them from the flow before any of the remaining smaller particulate matter is addressed.

One inorganic solid that can generally be removed from suitably dilute manure is sand. Removing sand from manure is advantageous in order to preserve rotating machinery operating in the dairy, particularly pumps. Sand is extremely pernicious relative to the equipment in a dairy. In some dairies, sand is used as bedding and, thus in these dairies the manure includes large volumes of sand. Additionally, even when sand is not used for bedding, cows will excrete several pounds per day of grit that are passed through from the feed they receive. Cows also track sand into the dairy. Sand is abrasive, and when moving in manure, sand abrades the surfaces it contacts. A manure handling system as taught herein will include a properly managed sand separation system. In typical embodiments, the gutter system will include either of a sand lane or a settling pit, or grit chamber, to remove heavy sediment from the system before further processing.

Sand separation lanes have come into conventional dairies as effective in the removal of some sand from manure, and by doing so, the preservation of manure handling equipment. Separation is based upon the distinct densities of the matter (i.e. water has a density of 62 lb./ft$^3$ whereas sand densities vary between 120 lb./ft$^3$ to 150 lb/ft$^3$). Where the flow of the heavy manure is slow enough, and where the suspension is suitably diluted with water, sand will settle out of the manure. The settling of sand in separation lanes allows for the periodic removal of sand from the lane in a manner that is more convenient than dredging a lagoon in regular dairy practice. Manure emerging from sand lanes is readily pumpable and it can often be used to motivate manure in gutters, though, as expressed above, most dairymen would want to reclaim the organic matter within the manure.

A typical sand separation lane is about 12 feet wide, several hundred feet long, with a slope of up to ¼% (or 3 inches per 100 feet in length), and an energy dissipater/flow dispersion system at the inlet end. The length of the lane depends on the size of the sand grains; with longer lengths needed for smaller sand grains. Often made of concrete, sand settling lanes are only a few feet in height, and a typical system will have two lanes to allow one to provide for drainage and clean out, while allowing the other lane to be in use. The dairyman can clean out the lane with a front end loader rather than having to clean the same out of storage lagoons.

Organic matter is reclaimed by any of screens, presses, or centrifuges to further remove suspended solids from manure. Used together or as distinct systems, these devices each separate with distinct technologies. For example, a screen is the most common method, often times poised within a gutter to remove the solids, the most common form is positions obliquely to the flow such that debris within the flow exploits its kinetic energy to be strained from the flow and to ride the screen up and out of the flow. Other forms exist as well but the most frequent exploits, in some manner, the oblique screen in order to prevent clogging.

A dewatering screw press also separates liquids from solids. Such a screw press can be used in place of a belt press, centrifuge, or filter. It is a simple, slow moving device that accomplishes dewatering by continuous gravitational drainage. The most commonly known screw press of this design is said to have been invented by famous Greek mathematician Archimedes and is known as the screw conveyor. The screw conveyor consists of a shaft, which is surrounded by a spiral steel plate, similar in design and appearance to a corkscrew. Gravity, too, presses water through perforations in the wall. That water is returned to the dairy while the solids are removed for other use, such as compost.

The most thorough dewatering device, generally used in conjunction with a screen as a preliminary separator is the centrifuge. For purposes of this application, it is useful to refer to two qualities of manure-laden water. The first of these shall be referred to as "light manure," having approximately one percent organic solids. The second is somewhat less dilute, but often usable for flushing is "heavy manure." The most common source of heavy manure is the intermediate water discussed above as coming off of the sand lane or other sand separation device. Heavy manure comprises from two to five percent organic solids, or, roughly between two to five times as much of the organic solids present in light manure. Of the two, light manure, carrying a lesser weight of organic solids, is the more desirable for use as flush water. Nonetheless, where light manure is not available, heavy manure, after sand separation where available, can serve as flush water.

Most commonly, a centrifuge is used to separate organic solids from heavy manure to yield light manure for flushing. A centrifuge is a device which employs a high rotational speed to separate components of different densities. The decanter is used for the separation of two or more phases of different specific gravity; in particular for the clarifying of liquids in which suspended solids are present. The separation of solids and liquids takes place within a cylindrical/conical rotating bowl, drawing the more dense organic solids through the heavy manure to accumulate on the periphery for removal from the resulting light manure.

Decanter centrifuges have a characteristic that dictates selection of an appropriate size. The spinning mass of the centrifuge is its most notable feature. Great amounts of energy are expended to bring the centrifuge up to its operating rotational speed. Frequent run and stop, deceleration with high inertia load, and overhauling torque tend to expend great amounts of energy and energy has a great cost. The optimally sized decanter is one that can exactly process all of the manure produced in a twenty-four hour period in twenty-four hours. When a centrifuge is idle, it is costly to return it to operation. In operation, the most efficient use of the centrifuge requires it to be consistently and constantly running.

Having described the separation mechanisms that make up a modern dairy manure management system, it is now possible to discuss the problems common with uniting them in a single system—optimization. The duty cycle of one means of separation may not correspond exactly either to use or to conveyance of water or manure within the dairy. Production of manure is, by its nature, intermittent. Most farmers milk their cows twice a day, but in a robotic milking system, cows sometimes choose to be milked four to five times a day. This doesn't necessarily mean that they are producing more milk, nor is it uncomfortable for them;

calves would naturally feed at four to six hourly intervals. Flushing, then, must be coordinated with the milking times. Production of manure and collection by flushing varies, then, throughout the day. So, in contrast, by way of example, to the centrifuge, production of manure is neither constant nor consistent over a twenty-four hour interval. To achieve the described efficiency of the centrifuge, there must be some manure held in reserve to feed the centrifuge when the production of manure by the cattle drops off.

To address this fact, tanks are routinely used as buffers for intermediate storage of light or heavy manure within the circuits which the water and courses within the dairy define. The capacity of such tanks, however, is itself problematic. To make each tank large enough to act as a buffer for the needs of the "downstream" processes can be expensive. In a dairy where flushing is not continuous, the tank must be sized to contain a twelve- or twenty-four hour capacity, so as to smooth the fluctuations in flow due to the vagaries of use.

As a construction cost, excavation and erection of tanks is one of the greater expenses in the construction of a modern dairy. Depth is more expensive than breadth in construction. In operation, depth is also expensive as the inevitable dredging of accumulate is more expensive as the depth increases. But volume is a relationship between these two variables. Additionally, the size of the footprint of any tank is an area of land that is not otherwise usable on the dairy. Naturally, the larger the footprint, the greater the capital cost of water reclamation. Economics, being the cruel mistress she is, will dictate that the scarce resources of land ought to be used in the smallest measure, wherever possible.

What the state of the art does not well provide is a means of reducing the size of these tanks between processes for handling water within the dairy. The smaller the tanks necessary, the smaller the capital expenditure and, thus, the more efficient the dairy. The method and system that are described and claimed below provide a more efficient means of water management in dairy husbandry.

SUMMARY OF THE INVENTION

A method and apparatus for collecting agricultural manure in a confined animal feeding operation includes a separator which receives heavy manure removing particulate from suspension to produce light manure. Heavy manure is collected to a volume of heavy manure sufficient to substantially fill the first tank. Within the first tank, particulate migrates, due to the influence of gravity to form a layer containing manure comprising a lesser density of particulate than is present in the volume of heavy manure. Additional heavy manure buoys the layer such that the upper surface exceeds a height of a weir. The weir is situated in a channel communicating between the first tank and a second tank configured to receive light manure from the separator.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
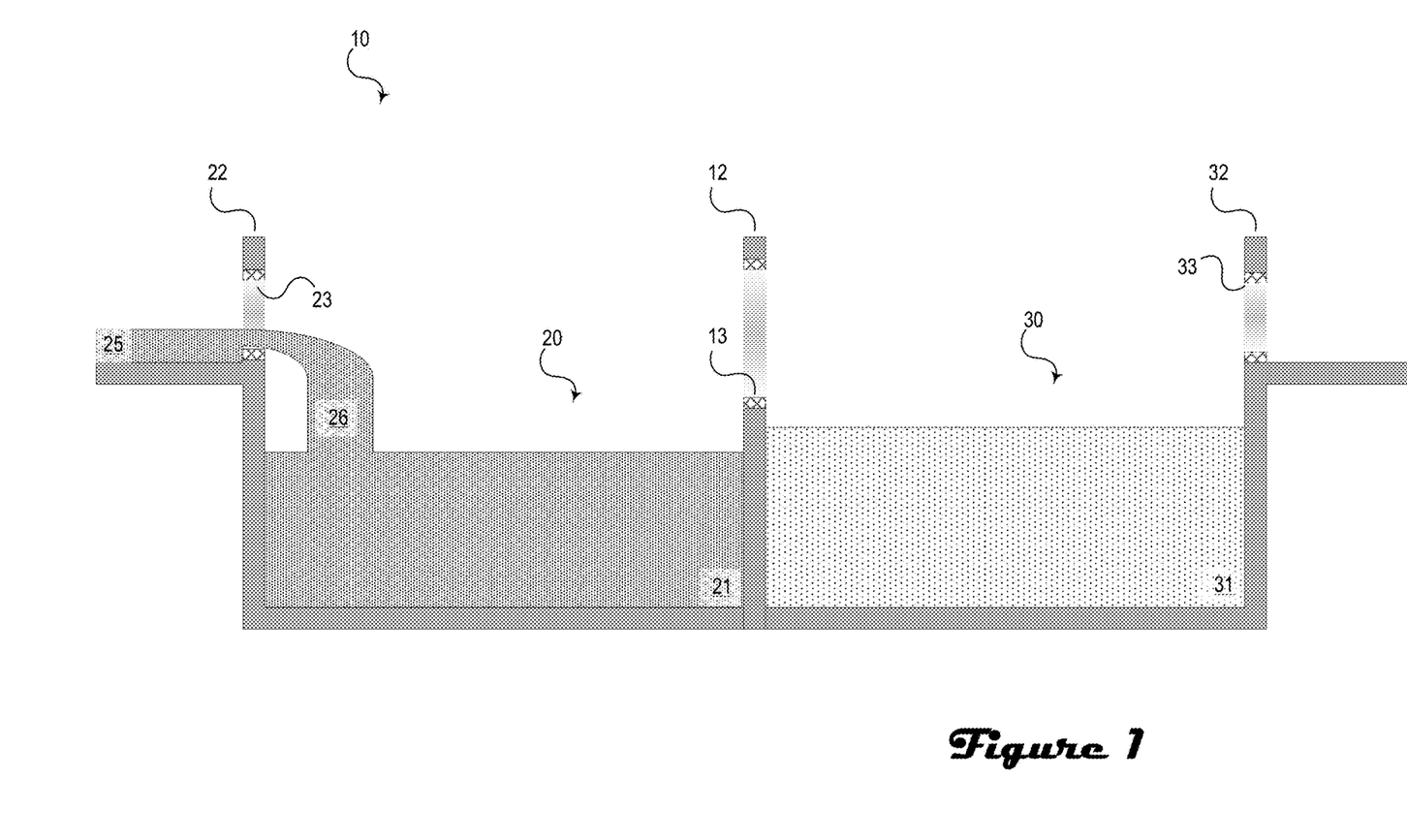
FIG. 1 depicts a flow of heavy manure into a two-tank weired reservoir comprising a communicating channel between the tanks.

A preferred embodiment of the invention is depicted in FIG. 1. A two-tank weired reservoir 10 is depicted as comprising a first tank 20 and a second tank 30 and having a communicating channel controlled by the presence of a weir 13 and in the preferred embodiment, weir 13 can be readily adjusted in height to regulate flow between the first and second tanks 20, 30. In alternate embodiments, the channel might be a pipe or channel, with or without a distinct adjustable weir, the water flow being regulated by the vertical height of the pep or channel relative to the surface levels of the manure present in each of the tanks 20, 30. As explained, it is not a necessary function of this invention that the weir 13 or any pipe or channel serving as the weir, itself be adjustable in height, though that feature is present in the preferred embodiment. No more than an aperture between the tanks is necessary to achieve the purpose of the invention; and, in the mind of the inventor, "weir" as used in the claims includes, as well, a plate defining an aperture. Even the plate defining the aperture, as might be present in some embodiments, could be adjustable in height relative to fluid levels anticipated in either of the first tank 20 or the second tank 30. For purposes of this application, the term weir as used in the claims will include channels and pipes for the conduct of fluid between the first tank 20 and the second tank 30. That liquid may pass between the two tanks 20, 30 based upon the levels of liquid within the tanks 20, 30 is minimally necessary to achieve the objects of this invention.

As described below, in the preferred embodiment, the adjustable weir 13 allows a dairyman a simple means for regulating the volumetric flow rate within the communicating channel comprising the weir 13. Since the geometry locating the top of the weir 13 is known and all water communicating between the first tank 20 and the second tank 30 flows over the weir 13, adjustment of the height of the weir 13 likewise adjusts the volume of fluid flowing between the tanks 20, 30.

In the exemplary embodiment portrayed in FIG. 1, the first tank 20 is defined between the septum 12 and a first tank exterior wall 22 which, itself, defines a first tank inlet 23. Likewise, the second tank 30 is defined between the septum 12 and a second tank exterior wall 32 which, itself, defines a second tank inlet 33. For purposes of this explanatory discussion, the channel is portrayed as an aperture the septum 12 defines. The weir 13 is adjustable in height in order to regulate the volume of water that will pass over the weir 13.

Parenthetically, the inventor notes, in a modern dairy, manure is moved by employing high volume manure pumps selected to create a flow rate adequate to prevent settling of manure solids and bedding material as the manure is transported. While pumps are not portrayed in these FIGS. 1-6, the presence of those pumps is presumed. Because the movement of pumped manure into and out of a tank is well-known and as such, the pumps are not portrayed as they add nothing to portraying the character of the conjoined tanks 20, 30. Rather, the first tank inlet 23 and the second tank inlet 33 are portrayed as open flumes in order to show, graphically, the flows into and out of the first tank 20 and the second tank 30 respectively. While such a flume system as illustrated certainly can be exploited in an embodiment of the invention, the preferred embodiment will include the high volume manure pumps that are more conventionally used for manure transport. Nonetheless, in order to better portray movement of liquid into the respective tanks herein, the figures show movement of manure into tanks as issuing from pipes above the manure levels. The inventor makes this specific disclaimer that the illustrated embodiment is not the preferred embodiment because of this illustration convention omitting the display of pumps. With the exception, however, of pumps to motivate the flows issuing from the pipes into each of the first and second tanks 20, 30, the preferred embodiment identically embodies each of the remaining features as they are portrayed in FIGS. 1 through 6.

Heavy manure 25 flows through a first tank inlet 23 the first tank exterior wall 22 defines, shown here as a flow 26 of heavy manure. The heavy manure flow 26 conveys heavy manure 25 to collect as a volume of heavy manure 21 within the first tank 20. Such is the designed purpose of the first tank 20, i.e. to receive and hold heavy manure between the septum 12 and the first tank exterior wall 22. When the heavy manure flow 26 stops, the organic solids within the contained heavy manure begin to settle due to gravity.

Just as is the practice with the second tank 30, the contents of the first tank 20 reside there to be drawn from in order to supply the water needs of a flush or flume dairy. In normal operation, the liquid levels will fluctuate with the operation of the dairy. Depending upon the needs of the dairy, either tank will receive or provide water based upon flush or flume needs in dairy operation. FIGS. 1 and 4, for example, both demonstrate the receiving of liquid in the first tank 20 and the second tank 30 respectively. As explained above, no pump is shown in FIGS. 1 through 6 because the explanation of the working of the system is more readily illustrated without the pumps. Indeed, the preferred embodiment will use pumps to move manure into and out of the first and the second tanks 20, 30.

Figure 2:
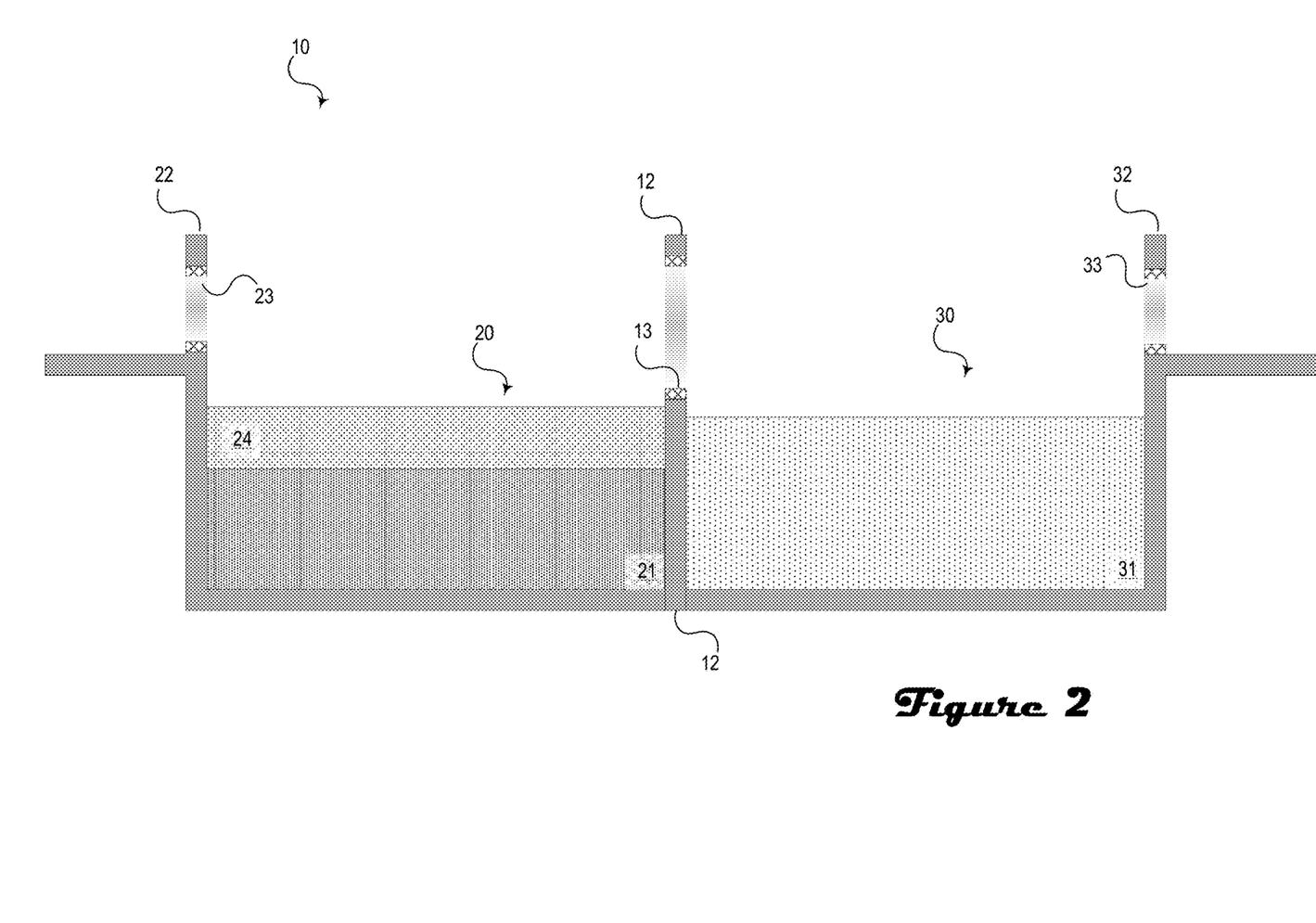
FIG. 2 depicts formation of a water layer on heavy manure in the first tank of a two-tank weired reservoir.

Referring now to FIG. 2, when not agitated, the volume of heavy manure 21 in the first tank 20 will tend to settle, producing a film or layer of water 24. Settled particles form a sludge layer at the bottom of a column the first tank 20 defines. When the free-falling, settling particles reach the top of the sludge layer, they decelerate as the space between particles becomes smaller, and the velocity of liquid increases. The pressing of particles together squeezes liquid from between them. Concentration of solids increases as the sludge layer deepens. As depicted in FIG. 2, particles fall from the raw heavy manure 21. Settling of particles in the volume of heavy manure 21 causes a layer of water 24 to form. The effect is well-known and is best explained from the vantage point of a single particle which floats on the more dense suspension of particles beneath it. Consider generally, the first of the particles to fall out of the raw heavy manure 25, leaving the region generally where a film of water 24 forms as the particles leave that region. As gravity draws the particle downward along with other like particles that might be present in the raw heavy manure 21 causing the density of particles locally to increase thereby slowing the particle's travel downward. As more particles fall to the lower region of the first tank 20, a film of water forms above a boundary as that boundary becomes better defined. As time passes, the film waxes to full layer of water 24 shown herein, spanning an encompassed surface area of the first tank 20. As a short time passes, the density of particles within the water approaches very nearly that of light manure 31, such as that stored in the second tank 30. This natural process exploits the advantageously formed layer of water 24, especially as this layer is formed in the most immediate neighborhood of the weir 13.

Figure 3:
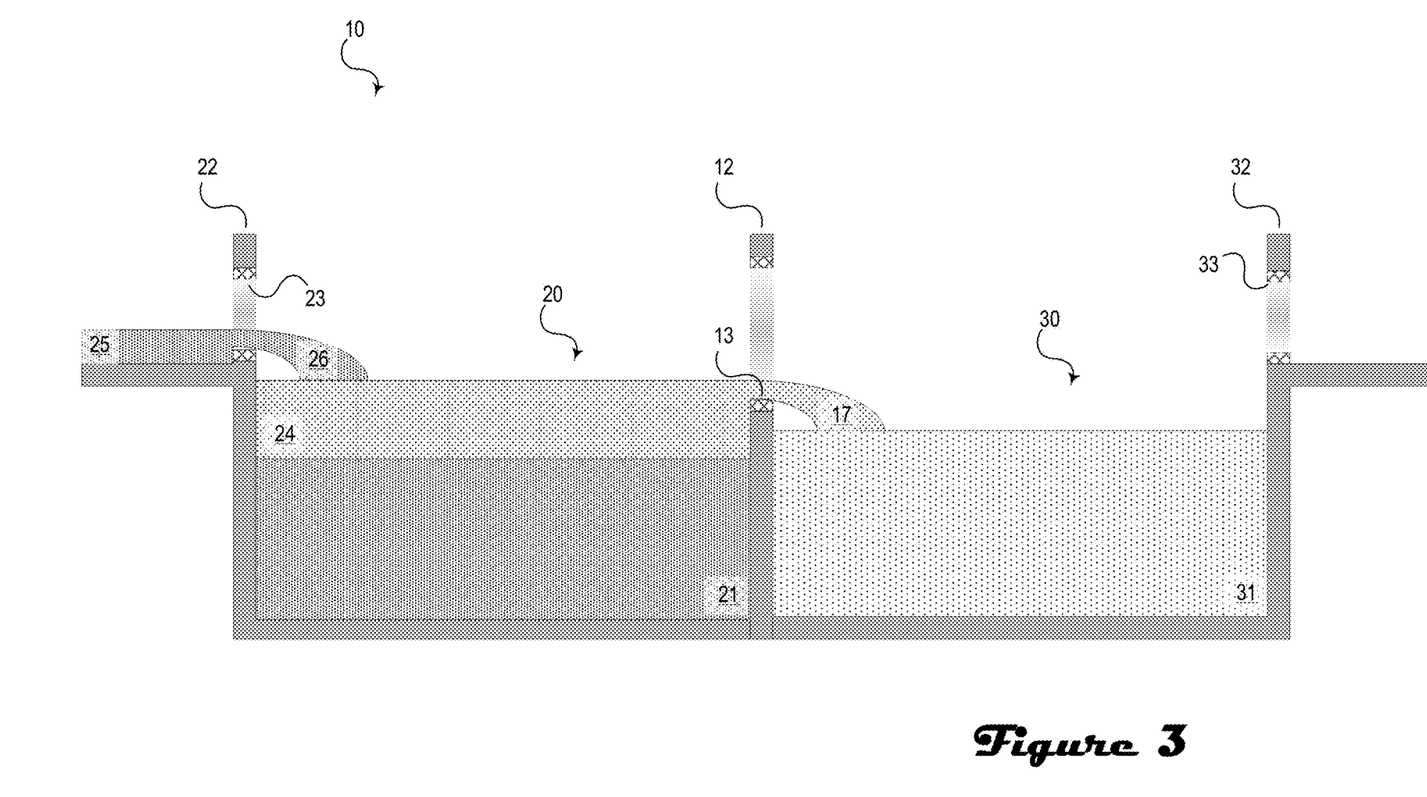
FIG. 3 depicts a flow of heavy manure buoying the water layer on heavy manure in the first tank of a two-tank weired reservoir driving water over the weir into a second tank.
Figure 4:
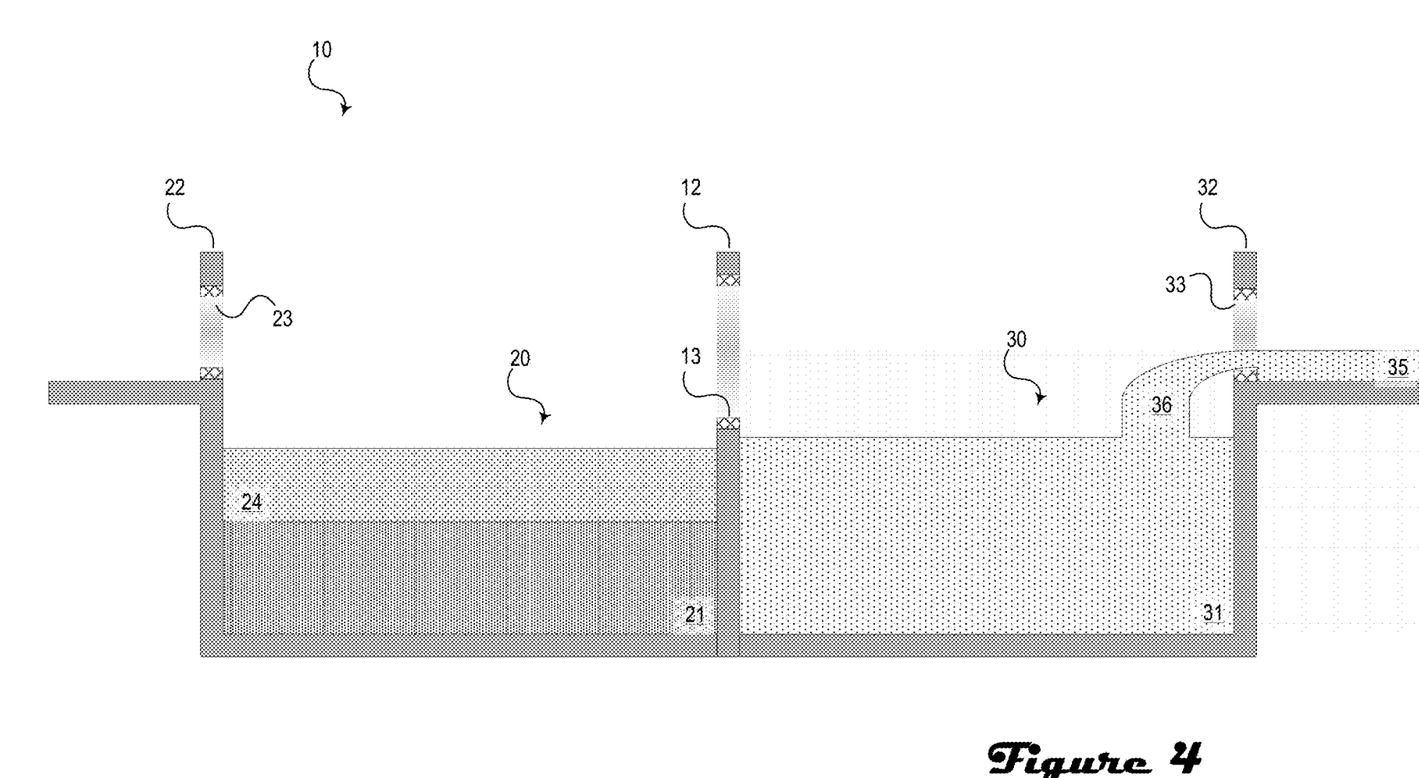
FIG. 4 depicts a flow of light manure into the second tank of the two-tank weired reservoir.

Referring now to FIG. 3, the first tank 20, is portrayed receiving a further flow of heavy manure 26, which, given the heavier density of the volume of heavy manure 21 moves swiftly through the layer of water 24 and settles into the lowest region of the first tank 20. As the received flow heavy manure 26 fills the lowest region within the first tank 20 the denser heavy manure 21 buoys up the layer of water 24 to a height exceeding the height of the weir 13, an overflowing that weir 13, initiates a flow of water 17 into the second tank 30. The second tank 30, analogous to the first tank 20, is defined by the septum 12 and a second tank exterior wall 32 (within includes a second tank inlet 33 that the exterior wall 32 defines).

For purposes of this application, light manure 31 resides in the second tank 30 and has been clarified by, for example, some of the processes described in text below in reference to FIGS. 7 through 10 below. The volume of light manure 31 within the second tank 30 is certainly suitable for use as flushing water. Likewise, the flow of water 17 introduced into the second tank 30 are suitable for use as flushing water and this introduction of the flow of water 17 into the second tank 30 does not compromise the use of contents of the second tank 30 as flushing water.

Figure 5:
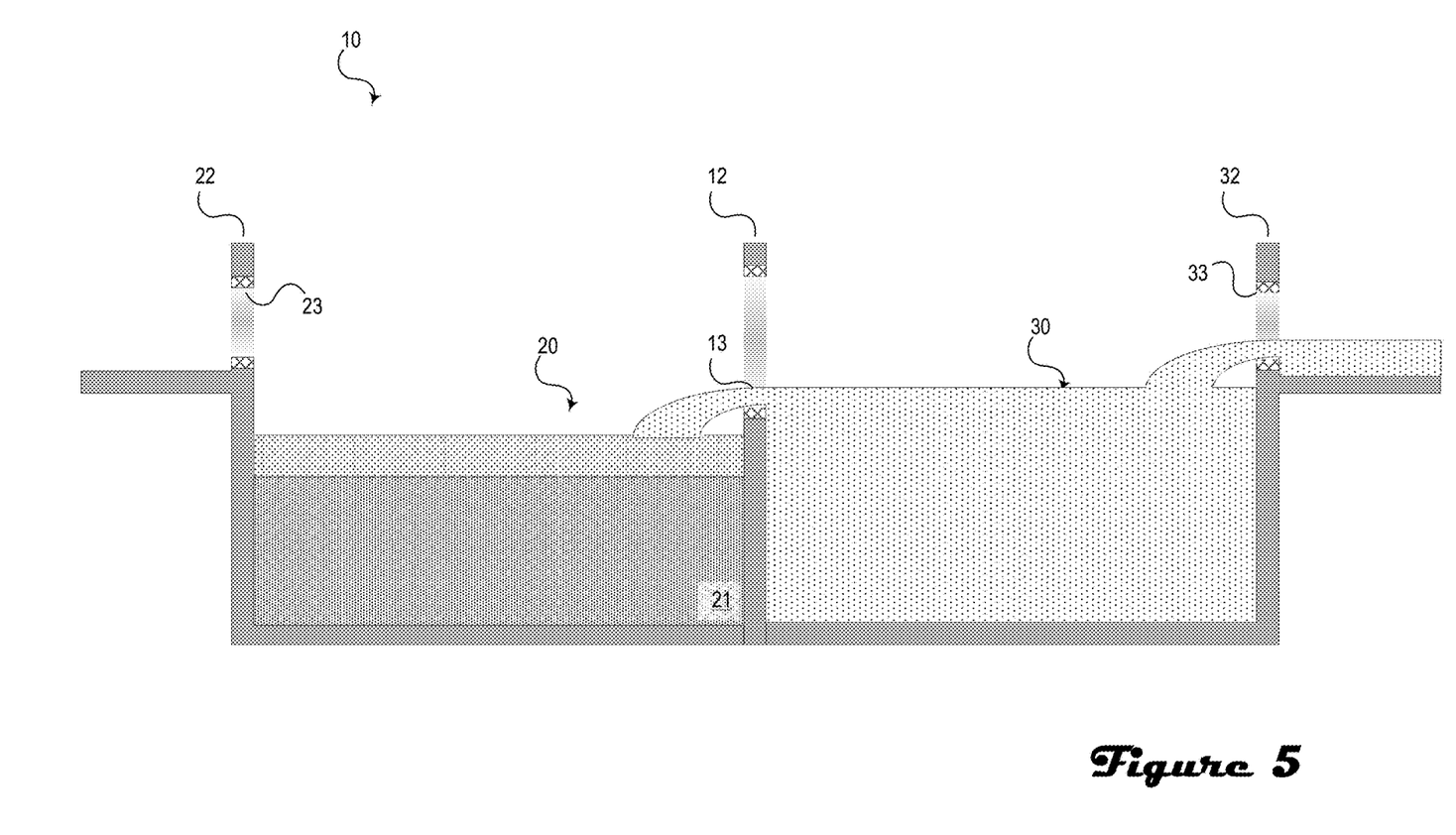
FIG. 5 depicts a flow of light manure into the second tank of the two-tank weired reservoir driving a further flow of light manure over the weir into the first tank.

Referring now to FIGS. 4 and 5, the second tank 30 serves as the repository for light manure 31, as light manure 31 is expelled through the second tank inlet 33 which the second tank exterior wall 32 defines to establish a flow 36 of light manure 31. The duty cycles of the dairy separation machinery causes the volume of light manure 31 to vary throughout a cycle of operation of the dairy. The purpose of the second tank 30 is to serve as the buffering reservoir for the output of separators such as the centrifuge or, by way of a second non-limiting example, the sand lane, just as the first tank 20 serves as a buffering reservoir for the input of the same separators.

Again, analogous to movement of water into and out of the first tank 20 described above, from time to time, the volume of light manure 31 will exceed the capacity of the second tank 30, generally due to the flow 36 of light manure 31 through the inlet 33 the second tank exterior wall 32 defines. Naturally, as the density of light manure 31 is, by definition, far less than the density of the heavy manure 21, the introduction of light manure 31 into the first tank 20 could not have any adverse effect upon any downstream manure handling machinery. In fact, the introduction of the liquid to the heavy manure 21 is likely to accelerate the settling of sand to form the layer of water 24 depicted herein.

In many cases, the introduction of light manure 31 in a flow 16 (as shown in FIG. 5) will reduce the viscosity of the heavy manure 21 by dilution, thereby allowing particles from the water layer 24 to settle more rapidly. Thus, when operations cause an excess of light manure 31 to accumulate in the second tank 30, the flow 16 from the second tank 30 to the first tank 20 does not adversely affect operation of the dairy.

Figure 6:
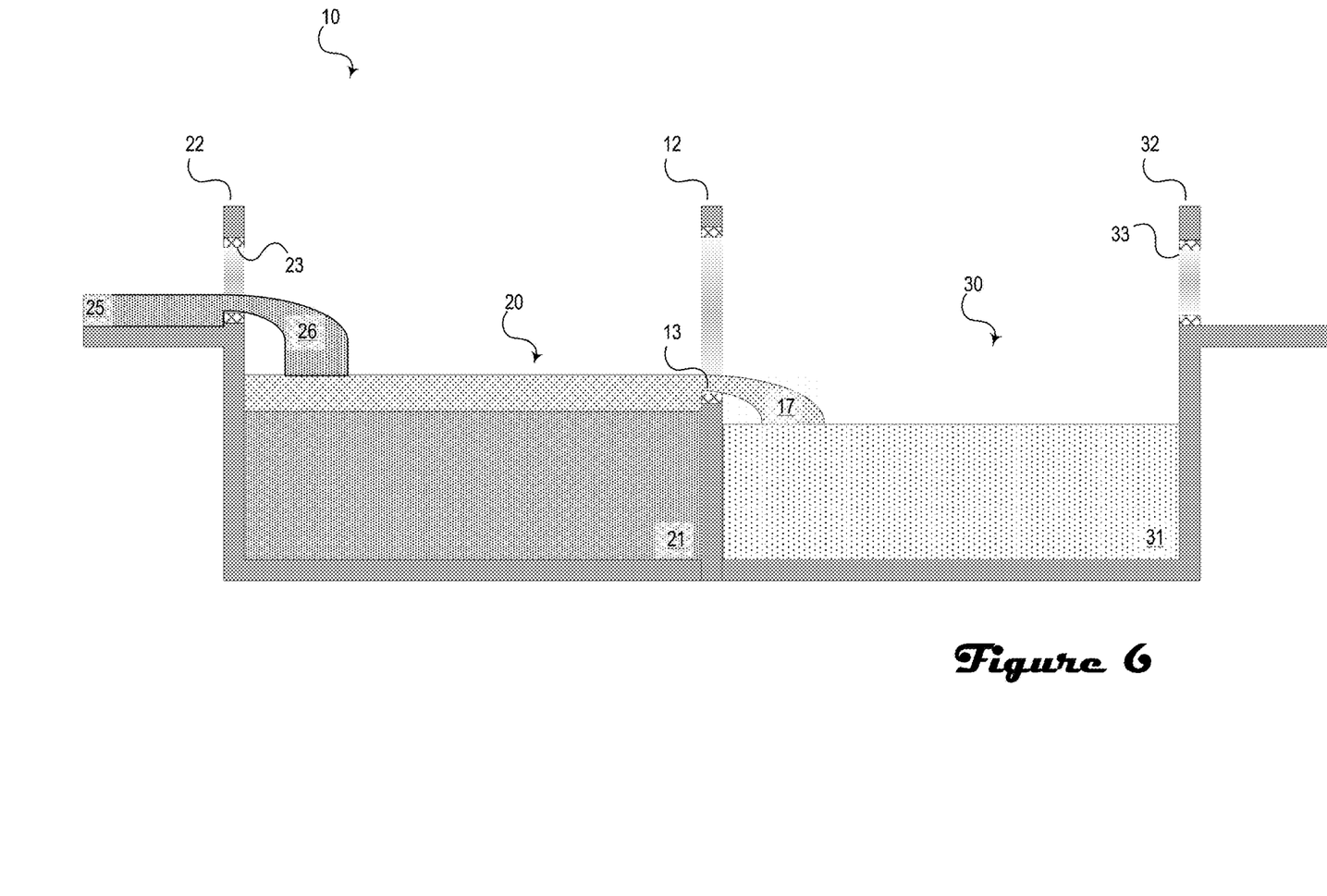
FIG. 6 depicts a flow of heavy manure buoying the water layer on heavy manure in the first tank of a two-tank weired reservoir driving water over the downwardly adjusted weir into a second tank.

As asserted, the presently preferred embodiment as depicted in FIG. 6, the dairyman has adjusted the height of weir 13 to be lower in height, thereby reducing the volume of each of the first tank 20 and the second tank 30 might receive, before any flow 16 or 17 between the tanks 20, 30 might occur. Such a feature might be used, either for tuning the manure handling system as a whole or to adjust to variations in volume of manure either light manure 31 or heavy manure 21 within the system. Thus, in the preferred embodiments of the invention, the height of the weir 13 is adjustable to allow the dairyman to adjust that height as the "fine tuning" used advantageously to promote efficient operation of the dairy. Naturally, the volume of the manure handling system can also be controlled by other means as well, for example, by sending excess liquid to long term storage in a lagoon. It will be readily recognized by persons skilled in the art that an adjustable weir 13 allows the dairyman to optimize timing and volumes of the flow 17 between the first tank 20 to the second tank 30 and the flow 16 from the second tank 30 to the first tank 20. Naturally, when a dairyman extends the weir 13 upward, the dairyman increases the volume of each of the first tank 20 and the second tank 30 before a flow 16, 17 could be instituted between the first tank 20 and the second tank 30. In doing so, the dairyman has increased the capacity of the dairy, as in some instances, to address the presence of additional cows within the herd. Should the cows be sold out of the herd, the weir 13 is adjusted back downward again to optimize the volume held within the two tanks 20, 30, relative to the size of the herd and such other factors as the astute dairyman might consider in adjusting the weir 13.

Figure 7:
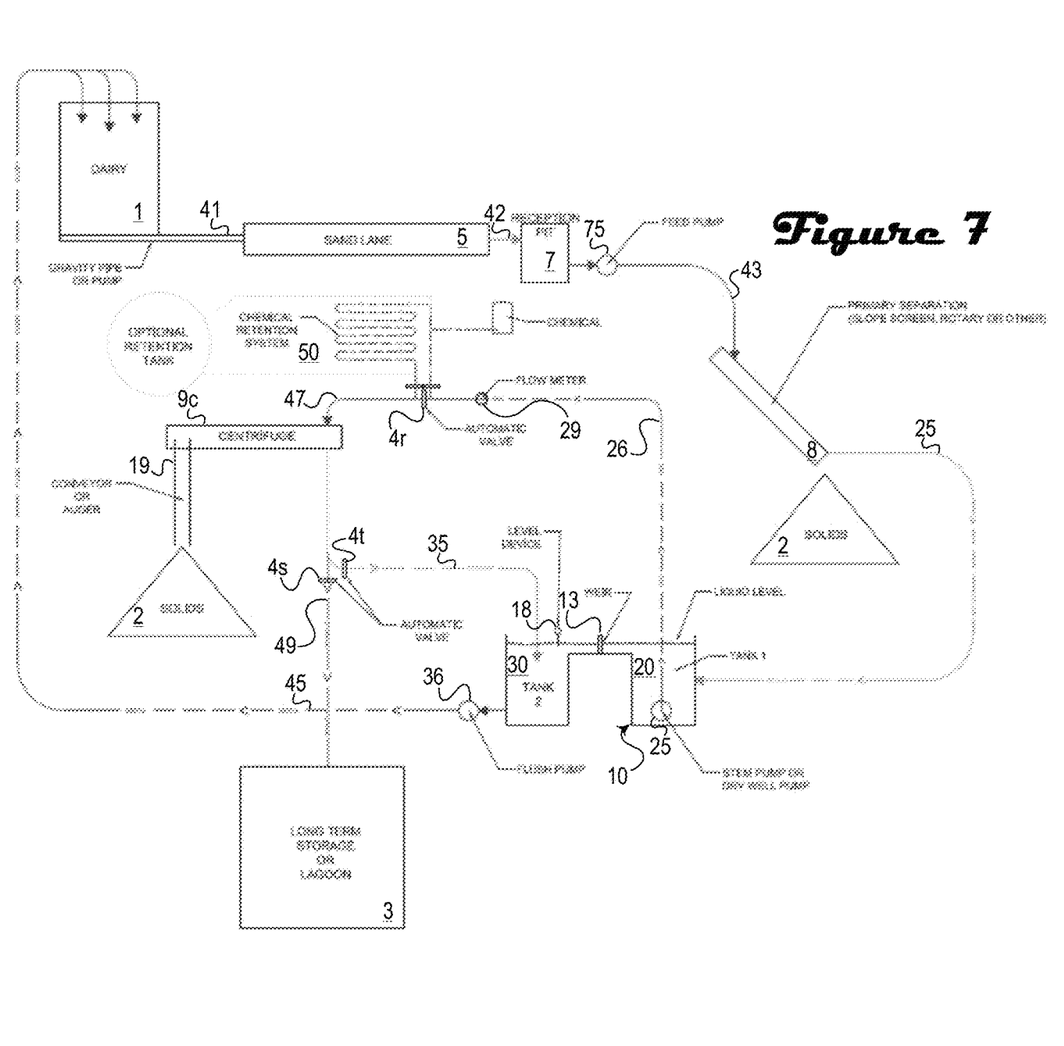
FIG. 7 depicts a flush dairy exploiting the two-tank weired reservoir and a centrifuge.
Figure 7A:
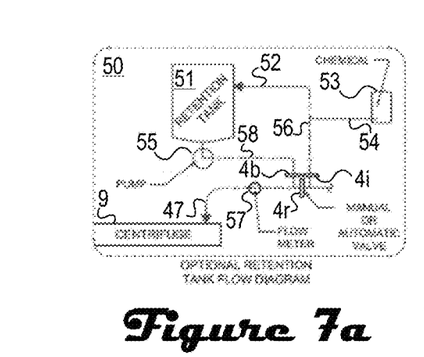
FIG. 7*a* depicts a detail inset showing an optional chemical retention system.

By way of overview, the installation of the inventive reservoir 10 has a significant beneficial effect upon the design of a modern dairy 1, such as the design depicted in a process diagram such as in FIG. 7 and a detail of an optional embodiment additionally depicted in FIG. 7a.

The specific design volume of the two-tank weired reservoir 10 will be dictated by the population and breed of the cattle. Cows differ considerably in the amount of manure they produce. Jerseys, for example, produce only 60% as much manure as Holsteins. Because of the distinct variables entailed, no systematic method is published here to calculate an exact relation between volume of manure produced and the combination of breed and population.

A number of different manure handling configurations are commonly used in dairy design. A flush system will fill the gutters with motivating flush water with organic solids entrained in the flush water which in the course of movement will substantially dilute the solid content of the manure. Flushing dairy facilities, such as milking parlors, holding areas and free stall alleys, can replace mechanical scraping or scraping with a tractor and blade. For optimum performance, flushed surfaces are usually sloped at 2 percent to 5 percent to provide adequate flow velocity for good cleaning and transport. Flush dairies are currently a preferred embodiment of the instant invention as it enjoys certain inherent advantages in operation:

Labor may be reduced.
Flushing systems may be easily automated.
Frequent flushing may result in cleaner facilities and less odor.
Operating costs are lower.
Flushing is suited to a low-labor system incorporating a lagoon and irrigation for storage/treatment and distribution of waste.
Flushing better accommodates large facilities and cow numbers.
Floors dry out better because wet, residual manure is removed.

In a flume system, movement of manure once in conduits is very similar in operation, but requires mechanical movement of the manure into the conduits referred to as "flumes," rather than to simply rely upon movement of flush water over the floor surface of the dairy 1. Once they receive manure, it is the flumes rather than the floor surfaces that are flushed with flush water to move the manure out of the barn. A flume system utilizes fast flowing liquid to transfer manure across the width of a barn or across several barns, generally in a round tube. A high volume pumps creates an adequate flow rate to prevent settling of manure solids and bedding material. Water addition, and separation or dewatering is needed before evacuating to further processing to retain enough liquid to keep the flush flume operating.

From the dairy 1, manure is conveyed by being entrained in the water, through a channel 41 ultimately to the first tank 20, typically a gravity pipe, i.e. a pipe placed with sufficient slope to motivate manure by gravity through the channel 41. In the embodiment of the invention here depicted, an optional sand lane 5 is used to initially separate sand from the manure. The sand lane 5 is effectively utilized on both flush and flush flume systems. In a typical sand lane, flush or flush flume water containing heavy manure 26 is introduced into a shallow, long and narrow channel (lane) at a high delivery rate. An energy dissipation system is usually installed at the head end of the lane to slow the velocity of the water and distribute the flow over the width of the sand lane 5. The bottom of the 12-foot-wide lanes conventionally will be sloped 0.2 to 0.25 percent. The water velocity slows to 1 to 2 feet per second in the sand lane 5 which allows the sand to settle out while washing most of the organic matter from the sand to continue through the sand lane 5 into a reception pit 7 by means of a channel 42.

The reception pit 7 sits at the lowest end of the channel 42 to collect manure from the dairy 1. The reception pit 7 in this exemplary embodiment is a fabricated manure storage tank of either concrete or coated metal with a glass lining and may be situated either above or below ground, though these are situated in this embodiment to simply allow gravity to motivate manure through the channel 42. By using the agitator in reception pits the manure is stirred into a homogenous mix, which allows it to be easily transported, by pumping, to the further into the system. Depending on the size of the storage, the agitator may be used daily or as often as necessary, to maintain the state of the manure.

In the presently preferred embodiment shown, a feed pump 75 transfers the manure to further separation through a pipe 43 to a primary sand separator 8. Sand separation may be through any conventional means, for example, by slope separator, a screen such as a wedge-wire screen, or a rotary separator. Naturally, the purpose is to remove as much of the sand as possible by the most economic means. Sand removed, for example, by wedge-wire screening need not later to be removed by centrifuge and, thus, preliminary removal has great and positive impact on the economics of manure handling. While not specifically necessary for successful operation of the two-tank weired reservoir 10, in a presently preferred embodiment, this screening is extremely advantageous and its use occurs at the primary separator 8. Sand so removed is generally stacked as solid 2 and in some dairy operations rinsed for use as bedding for cattle. Advantageously, such sand can readily be recovered, used, and reused and where well-tolerated by the cows, it is can be used economically with far greater utility than straw or other organic bedding.

Screen separators 8 include stationary inclined, vibrating, rotating, and in-channel flighted conveyor screens. All separators of this type involve a screen of a specified pore size that allows only solid particles smaller in size than the openings to pass through. This type of separator generally works best with manure having a solids content of less than 5%. In use of a stationary inclined screen, liquid manure is pumped to the top edge of the inclined screen. Liquids pass through the screen while the solids accumulate on the screen and eventually move downward due to gravity forces and fluid pressure.

In use of a vibrating screen, liquid manure is pumped onto the flat vibrating screen at a controlled rate. The liquid flushes through the screen while the rapid reciprocating motion employed moves the solids to the screen edge where they are collected. The vibration reduces clogging of the screen. Obviously, the power requirement is higher with a vibrating screen system than with the stationary inclined screen.

A continuously turning or rotating screen receives liquid manure at a controlled rate. The liquid passing through the screen is collected in a tank while the retained solids are scraped from the surface into a collection area. A refinement of the continuously turning or rotating screen is the In-channel flighted conveyor screen. This screen separator system consists of an inclined screen and a series of horizontal bars, called flighted conveyors. The separator can be placed directly in an open manure channel, which eliminates the need for a sump or a pit and a lift pump. Liquid passes through the screen and drains into the channel on the downstream side of the separator, while the separated solids are deposited on a collection pad. Uses are similar to those of the stationary inclined screen separators, but the in-channel flighted conveyor screen separator requires more mechanical maintenance, as its moving parts are exposed to corrosive and abrasive materials, such as sands and chemical constituents of manure.

Presses act as continuously-fed dewatering devices that involve the application of mechanical pressure to provide additional separation of the manure slurry. They are often used to remove additional water from the separated solids portion produced following screening or centrifugation. This physical separation process typically achieves a high level of dewatering and the pressed solid cake can be composted or used for refeeding. The three main types of mechanical filtration devices are roller, belt, and screw presses. A fourth type is the filter press. The more prevalent is the roller press, having two concave screens and a series of brushes or rollers. The manure slurry is initially deposited onto the first screen and then moved across the two screens with brushes and squeezed by the rollers. The liquids are squeezed through the holes while the solids remain on the screen. The following two separators use these principles in their operation. A further refinement is the two-stage double roller compression separator. Liquid slurry is force-fed into the first set of perforated separator rollers. Separated liquid is removed at this point for storage. Separated solids from the first stage are conveyed to the second set of separator rollers where the fiber solids are removed by a mechanical conveyor to the storage area. The liquid fraction is drained off at this point and returned to the initial liquid slurry tank. Any of the several of these might advantageously be used for primary separation 8.

Having separated the major portion of sand from the manure at primary separation 8, the sand-separated or heavy manure 21 travels through a conduit such as a channel or pipe to the second tank 30 which functions as described above with reference to FIGS. 1-6. The weir 13 and septum 12 defining the weir 13 are both present as is the second tank 30. Not shown in the previously depicted embodiments is the level sensor 18, in this case present in the second tank 30. The level sensor 18 serves the dairyman by giving and recording the levels in the tank (or where two are used, one level sensor 18 assigned to each tank), and allows for predictions to readily be made as to the optimal positioning of the weir 13 in embodiments having an adjustable weir 13.

From the first tank 20, a pump 25 that might also, at times be used for agitation, motivates a stream of manure from the first tank 20 through a conduit 26 where, in this embodiment, a flow meter 29 to an automatic valve 4r that in some embodiments are used to admit manure into a pipe 47 to feed the centrifuge 9. As is shown, in some embodiments, chemical additives might be used to accelerate the aggregation of particulate in the manure making it easier to remove.

In operation, the automatic valve 4r would close and both of the intake valve 4i, and the return valve 4b open to admit manure to an optional chemical separation plant 50. In the presently preferred embodiment, as shown in FIG. 7a a circuit includes two sets of valves, an intake valve 4i and a return valve 4b to the conduit 57 to feed the centrifuge, and a retention valve 4r which obstructs manure from bypassing the chemical plant 50 when closed.

In the preferred embodiment the normally-closed intake valve 4i and normally-closed return valve 4b, both open and the normally open rerouting valve 4r closes to add the circuit the chemical plant 50 comprises to the path of manure through the conduit 26 to the conduit 57 to feed the centrifuge 9. Each valve 4i, 4b, 4r will change its state to the opposite state while at same time making the normally preferred embodiment to comprise a manifold with a single impulse that changes the state of each of the three valves 4i, 4b, 4r.

Separation of a liquid fraction from the solid fraction of manure can be made more effective through addition of chemicals to coalesce particles of organic matter in a solid fraction. In this optional process, chemicals selected to improve the retention of the plant nutrients in the solid fraction are added prior to mechanical separation in the optional chemical plant 50. Additions of such chemicals assist with the production of a liquid fraction with a composition that is more readily separated from the solids and diminishes the energy necessary to perform the separation. Flocculation, coagulation, and precipitation are methods to enhance mechanical liquid/solid separation. In most suspensions, colloidal particles do not aggregate spontaneously because such particles are negatively charged and repel each other. However, aggregation is facilitated by adding either multivalent cations that cause coagulation or polymers that promote flocculation. The addition of multivalent cations also triggers precipitation.

The chemical plant 50 as depicted in FIG. 7a, draws manure through a conduit 56 where chemicals from a chemical tank 53 are introduced into a flow of manure through a conduit 54. The mixed manure chemical cocktail then proceeds through the conduit 52 and at a retention tank 51 the chemicals are allowed to diffuse through the mix.

Naturally, to the extent manure precipitates out, it can be collected from the retention tank 51. When appropriate in the operation of the dairy, the retained manure is drawn out of the retention tank 51 by a retention tank pump 55 though both of a conduit 58 and the return valve 4*b* to be fed through the conduit 57, to the centrifuge 9.

The centrifuge 9 is a device, which employs a high rotational speed to separate components of different densities. Typically centrifuges 9 consist of a horizontal or vertical cylinder which is continuously turned at high velocities. Centrifugal forces separate the liquid and solids onto the inside wall of the cylinder into two layers. An auger, which turns slightly faster than the cylinder, moves the solids to the conic part of the unit where they are discharged. The two types of centrifuge 9 separators are centrisieves and decanters. Centrisieves consist of an inclined revolving drum that is lined with a filter cloth. The slurry to be separated is pumped into the drum center. The liquid leaves the drum through the filter cloth and the solids move by centrifugal force to the edge of the drum where they are removed separately.

In the case of decanter centrifuges, an auger, turning at a slightly higher speed than the cylinder in which it is contained, moves the slurry to the conic part, where it is discharged. Centrifuges are very effective at solids separation and can achieve relatively low moisture levels. The initial cost is high, however, and the energy requirement is also quite high in comparison to other systems. The decanter centrifuge, however, is considered as the workhorse of a wide range of liquid/solid separation activities. Its application to the dewatering of waste sledges has made it a most valuable tool in animal husbandry. The dewatered solids 2 are conveyed from the centrifuge 9 and can be used for example, as compost or to be digested to produce methane.

The effluent is largely pure water and traverses to the second tank 30 as sand-separated light manure 31. It is important to understand that while it is not potable, the light manure 31 is almost entirely consisting of water 24. As such, it contains very few organic or inorganic solids and is very suitable for use as flush water to begin the whole cycle again. The second tank 30 is used just for such storage, and to the extent that water 24 from the first tank 20 spills in a flow 17 into the second tank 30, the presence of that water 24 will not contaminate the light manure 31 to prevent its use as flush water available through the flush water pipe 45 at the dairy.

Where too much water is recovered from the manure at the centrifuge 9, two further automatic valves 4*s*, 4*t* work in tandem to divert the flow from the second tank 30 to long-term storage in a lagoon 3. Indeed, nothing prevents use of a ball valve to simply divert manure from the sand-separated manure conduit 35 to flow down the lagoon conduit 49 for long-term storage in the lagoon 3.

Figure 8:
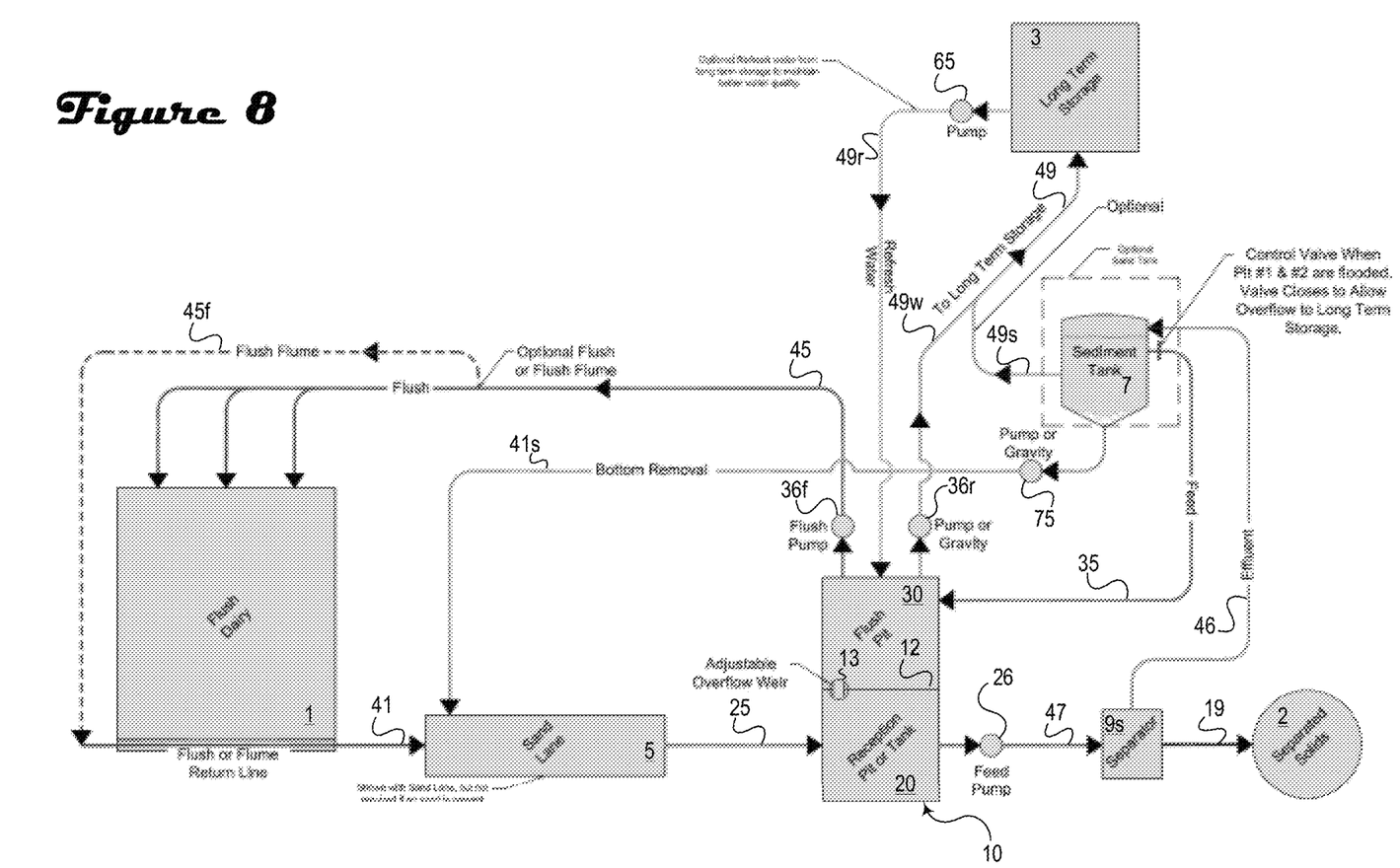
FIG. 8 depicts a flush dairy exploiting the two-tank weired reservoir and a sediment tank serving as separator.

The two-tank weired reservoir 10 is not limited to embodiments wherein a centrifuge 9 is employed. By way of non-limiting example, FIG. 8 depicts a flush dairy 1 which drains manure through a channel 41 into a sand lane 5 where sand is separated from the manure in a first separation to flow into the first tank 20 of the reservoir 10. A feed pump 26 transfers the manure to a separator 9. As discussed above, separation may be through any conventional means, for example, by slope, a screen such as a wedge-wire screen, or a rotary separator. Naturally, the purpose is to remove as much of the sand as possible by the most economic means. Solids such as sand are removed by conveyor 19 or by such means as a skid loader to where the solids are stacked as solids 2, for such use as is economical.

Sedimentation tank 7 is another form of separator also called settling tank or clarifier. A sedimentation tank allows suspended particles to settle out of water or wastewater as it flows slowly through the tank, thereby providing some degree of purification. A layer of accumulated solids, called sludge, forms at the bottom of the tank and is periodically removed.

Manure leaving the separator 9*s* travels by pipe 46, in this embodiment, as effluent to such a sediment tank 7 for further settling of solids. At the sediment tank 7, light manure can be sent back to the second tank 30 through a feed line 35 to fill the second tank 30. Excess light manure is suitable for flushing in its state leaving the sediment tank 7 through either a pump 75 into a pipe 41*s* to serve as a dedicated flush for the sand lane 5 or into the second tank 30 as a reservoir for flush water 31 to supply, through the flush pump 36*f* that feeds flush water through a pipe 45 to flush the flush dairy 1. Where an excess of flush water is present in the second tank 30, the contents of the sediment tank 7 are shunted by pipe 49*s* into the lagoon 3 for long-term storage, thereby being available to "top up" the system by conveyance through the feed pump 65 through a pipe 49*r* to the second tank 30 when necessary. Also shown is the flush flume 45*f* should the dairy 1 be configured as a flume dairy rather than a flush dairy. That the two-tank weired reservoir 10 is so readily adaptable to various configurations gives testimony to its versatility and utility in various manure management systems.

Figure 9:
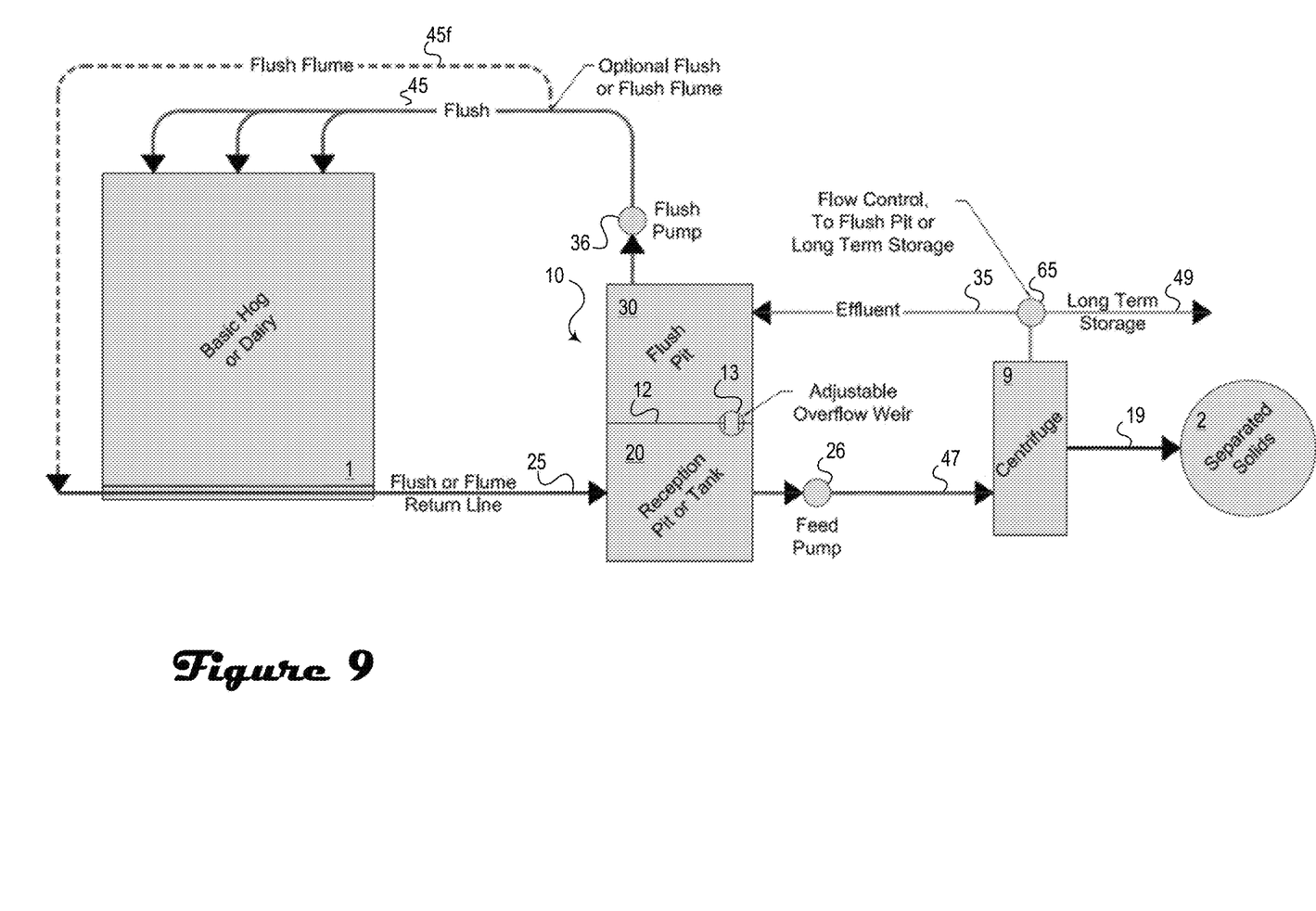
FIG. 9 depicts either of a hog feeding surface or a dairy exploiting the two-tank weired reservoir exploiting a centrifuge without a primary separator.

Hogs, generally, do not use or need either of sand or straw bedding which obviates the need for extensive trapping and separating of sand from manure. Such is not to say that there are not some particles of sand to be contended with but where a decanter centrifuge 9 is in use, systems can be designed without distinct separation means to protect the centrifuge from the undue wear that sand imparts on moving parts. This simplest embodiment of an operating manure management system in a flush dairy or swine farm with flushable sties is illustrated in FIG. 9.

While sharing many of the basic elements of the other demonstrated embodiments illustrated above, the manure management system shown is among the simplest embodiments of the invention. Still relying, as it does, on the two-tank weired reservoir 10, the flush return line 25 feeds the first tank 20 as it does either directly or indirectly after sand separation, as in a lane 5, in every embodiment.

Because there is present, relatively little inorganic solid in the manure 21 held in the first tank 20, the centrifuge 9 is fed at a nearly constant rate through the feed pump 26. Drawing from the first tank 20 and feeding the centrifuge 9 through the feed pipe 47, the centrifuge 9 delivers separated solids for compost. A conveyor 19 delivers these to a pad for stacking solids 2.

When the solids have been removed from suspension at the centrifuge 9, the remaining liquid is flush-quality water pumped either to the lagoon 3 (not shown) through a lagoon conduit 49 for long-term storage, or, to meet the more immediate needs of the dairy or swine farm 1 into the second tank 30 through a feed pipe 35 for storage as sand-separated manure 31.

When needed, the sand-separated manure 31 is drawn from the second tank 30 with a flush pump 36 and through either a flush manifold 45 or a flush flume pipe 45*f* to clean and entrain manure from the dairy or swine farm 1. And so the process continues exploiting the two-tank weired reservoir 10 as a principal buffer in the management of manure.

While the preferred embodiment of the invention has been illustrated and described, as noted above, many changes can The embodiments of the invention in which an exclusive property or privilege is claimed are defined as follows:

1. An apparatus to recover flush water from a flow of heavy manure, the apparatus comprising:
   a centrifuge, for separating manure drawn from a first tank, from a flow of heavy manure, thereby to produce a flow of light manure;
   the first tank for receiving the flow of heavy manure to retain a volume of heavy manure, the first tank being defined by a first tank wall extending upward to a first tank wall height;
   a second tank for receiving the flow of light manure from the centrifuge and to retain a volume of light manure, the second tank being; defined by a second tank wall extending upward to a second tank wall height
   a channel defined by each of a wall the first tank comprises and a wall the second tank comprises; and:
   a weir means situated within the channel, the weir means to regulate flow along the channel between the first tank and the second tank wall, the weir means extending to a weir height lower than either of the first tank wall height and the second tank wall height, whereby the weir means is configured to facilitate, alternatively, each of a pair of flows over the weir means, the pair of flows consisting of:
   a first flow occasioned by the receiving over the weir means; into the first tank, an additional volume of heavy manure to buoy a layer containing light manure, comprising a lesser density of particulate than is present in the volume of heavy manure upon which the layer rests, such than the upper surface of the layer exceeds the weir height; and
   a. second flow occasioned by receiving in the second tank, from the centrifuge, a volume of light manure sufficient to overflow the weir means and, thereby to allow light manure to flow over the weir means into the first tank.

2. The apparatus of claim 1, wherein a weir height is adjustable such that by either of raising or lowering the height of the weir means that raising or lowering simultaneously adjusts a first tank capacity and a second tank capacity such that raising the height of the weir means increases each of the first tank capacity and the second tank capacity and lowering the height of the weir means decreases each of the first tank capacity and the second tank capacity.

3. The apparatus of claim 1, wherein the second tank defines a lagoon conduit such that the volume of light manure can be either removed to a lagoon from the second tank or transported to the second tank from the lagoon in order to maintain a select volume of light manure in the second tank.

4. The apparatus of claim 1, wherein the first tank defines a separator channel, the separator channel including a chemical feed configured for adulterating heavy manure drawn from the first tank to feed a separator, the chemical feed charged with a chemical selected to increase a mass of particulate the centrifuge removes from a unit volume of heavy manure to produce light manure.

5. The apparatus of claim 1, wherein the first tank includes a first tank pump to feed a separator.

6. The apparatus of claim 1, wherein the second tank includes a second tank pump to transport light manure to flush surfaces of a confined animal feeding operation.

7. A confined animal feeding operation comprising:
   a floor surface defining floor channels for receiving urine and feces from animals;
   nozzles situated to introduce a flow of light manure to the floor surface to flush urine and feces from the floor surface, entraining the urine and feces in light manure to produce heavy manure;
   a centrifuge, for separating manure drawn from a first tank, from a flow of heavy manure, thereby to produce a flow of light manure;
   the first tank for reception of heavy manure from the floor channels and collection of the heavy manure therein, the first tank being defined by a first tank wall extending upward to a first tank wall height;
   a second tank for storage of the light manure, the second tank including a pump to feed the nozzles with the flow of light manure, the second tank wall extending upward to a second wall height;
   a communicating channel extending from the first tank to the second tank and defining a weir means extending upward to a weir height, the weir height being selected to be lower than either of the first tank wall height and the second tank wall height, whereby the weir means is configured to facilitate, alternatively, each of a pair of flows over the weir, the pair of flows consisting of:
   a first flow occasioned by the receiving in the first tank, an additional volume of heavy manure so as to buoy a layer containing light manure, the light manure comprising a lesser density of particulate than is present in the volume of heavy manure such that the upper surface of the layer exceeds, in height, the weir height; and
   a second flow occasioned by receiving in the second tank, a volume of light manure sufficient to overflow the weir means and thereby, to allow light manure to flow into the first tank.

8. The confined animal feeding operation of claim 7, wherein the first tank defines a separator channel, the separator channel including a chemical feed configured for adulterating heavy manure drawn from the first tank to feed a separator, the chemical feed charged with a chemical selected to increase the mass of particulate the centrifuge removes from a unit volume of heavy manure to produce light manure.

9. The confined animal feeding operation of claim 7, wherein the second tank defines a lagoon conduit such that a volume of light manure can be either removed to the lagoon from the second tank or transported to the second tank from the lagoon in order to maintain the selected volume of light manure in the second tank.

10. The confined animal feeding operation of claim 7, wherein the weir height is adjustable such that by either of raising or lowering the weir height regulates the flow over the weir and further that raising or lowering simultaneously adjusts a first tank capacity and a second tank capacity such that raising the weir height increases each of the first tank capacity and the second tank capacity and lowering the weir height decreases each of the first tank capacity and the second tank capacity.

11. The confined animal feeding application of claim 7, wherein the first tank includes a first tank pump to feed the centrifuge.

12. An apparatus to recover flush water from a flow of heavy manure, the apparatus comprising:

a first tank for receiving the flow of heavy manure being defined by a first tank wall extending upward to a first tank wall height;

a second tank being defined by a second tank wall extending upward to a second tank wall height;

a centrifuge configured to draw heavy manure from the first tank and to deposit such liquid fraction as the centrifuge separates from the heavy manure into the second tank;

a channel defined by each of a wall the first tank comprises and a wall the second tank comprises and providing a communicating conduit between the first and second tanks; and a weir means situated within the channel, the weir means extending upward to a weir height lower than either of the first tank wall height and the second tank wall height the weir means being configured to facilitate, alternatively, each of:

a first flow transiting from the first tank to the second tank occasioned by a first tank volume having accumulated within the first tank, to a height exceeding the weir height; and a second flow transiting from the first tank to the second tank occasioned by a second tank volume having accumulated within the second tank, to a height exceeding the weir height.

13. The apparatus of claim 12, wherein the weir height is adjustable such that by either of raising or lowering the weir means within the channel, that raising or lowering simultaneously adjusts the first tank volume and the second tank volume such that raising the height of the weir means increases each of the first tank volume and the second tank volume and lowering the height of the weir means decreases each of the first tank volume and the second tank volume.

14. The apparatus of claim 13, further comprising:

a lagoon conduit configured to conduct light manure from the second tank through a lagoon conduit either from the second tank to a storage lagoon, or, in turn, from a lagoon to the second tank.

15. The apparatus of claim 12, wherein the centrifuge further includes a chemical feed configured for adulterating heavy manure drawn from the first tank to feed the centrifuge, the chemical feed charged with a chemical selected to increase a mass of particulate the centrifuge removes from a unit volume of heavy manure.

16. The apparatus of claim 12, wherein a first tank pump motivates the flow of light manure to feed a separator.

17. The apparatus of claim 12, wherein the second tank includes a second tank pump to transport light manure to flush surfaces of a confined animal feeding operation.

* * * * *